Oct. 17, 1944.   C. E. LINDEN ET AL   2,360,695
HYDRAULIC GEAR SHIFTING AND DRIVING SYSTEM
Original Filed Oct. 14, 1940   3 Sheets-Sheet 1
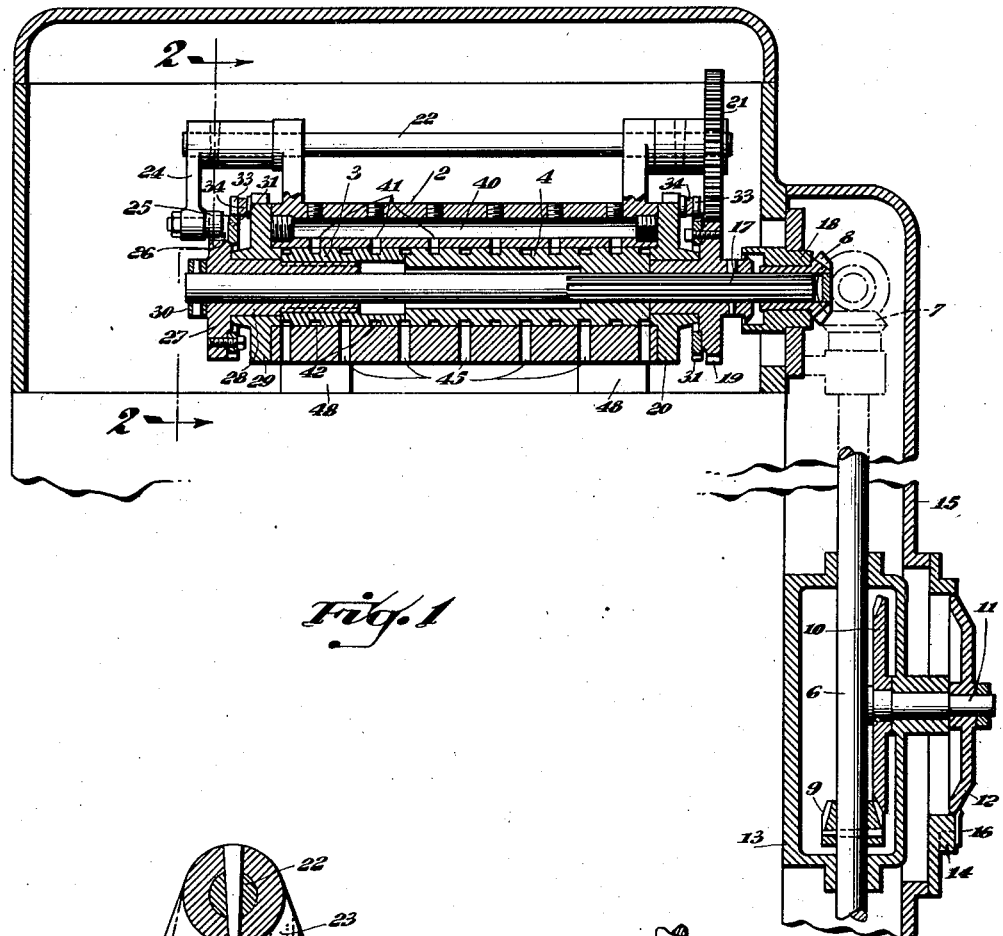
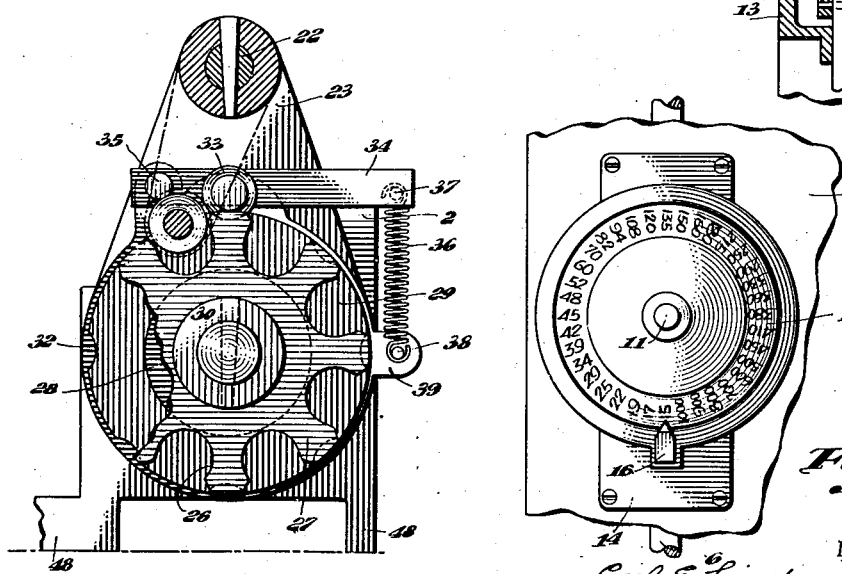

Oct. 17, 1944. C. E. LINDEN ET AL 2,360,695
HYDRAULIC GEAR SHIFTING AND DRIVING SYSTEM
Original Filed Oct. 14, 1940  3 Sheets-Sheet 2
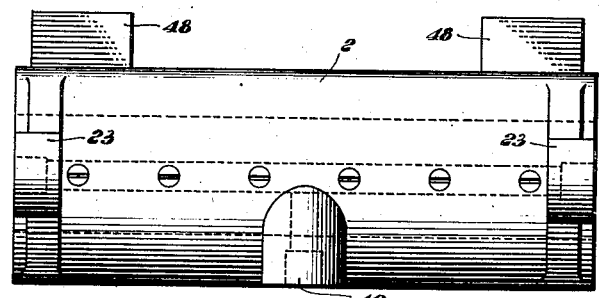
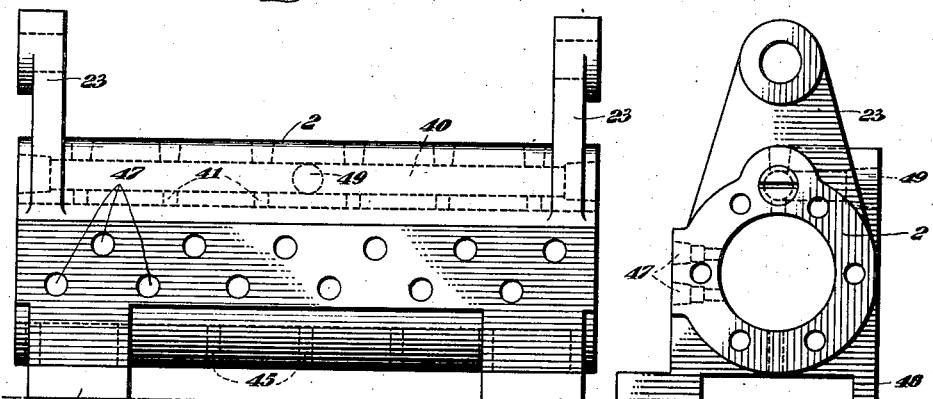
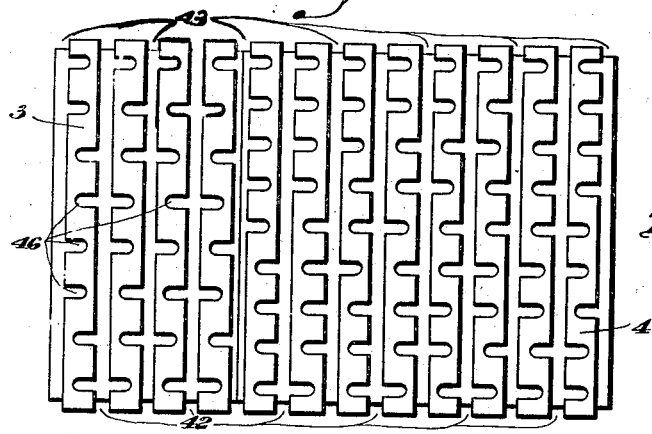
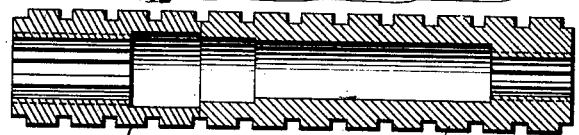 
INVENTOR.

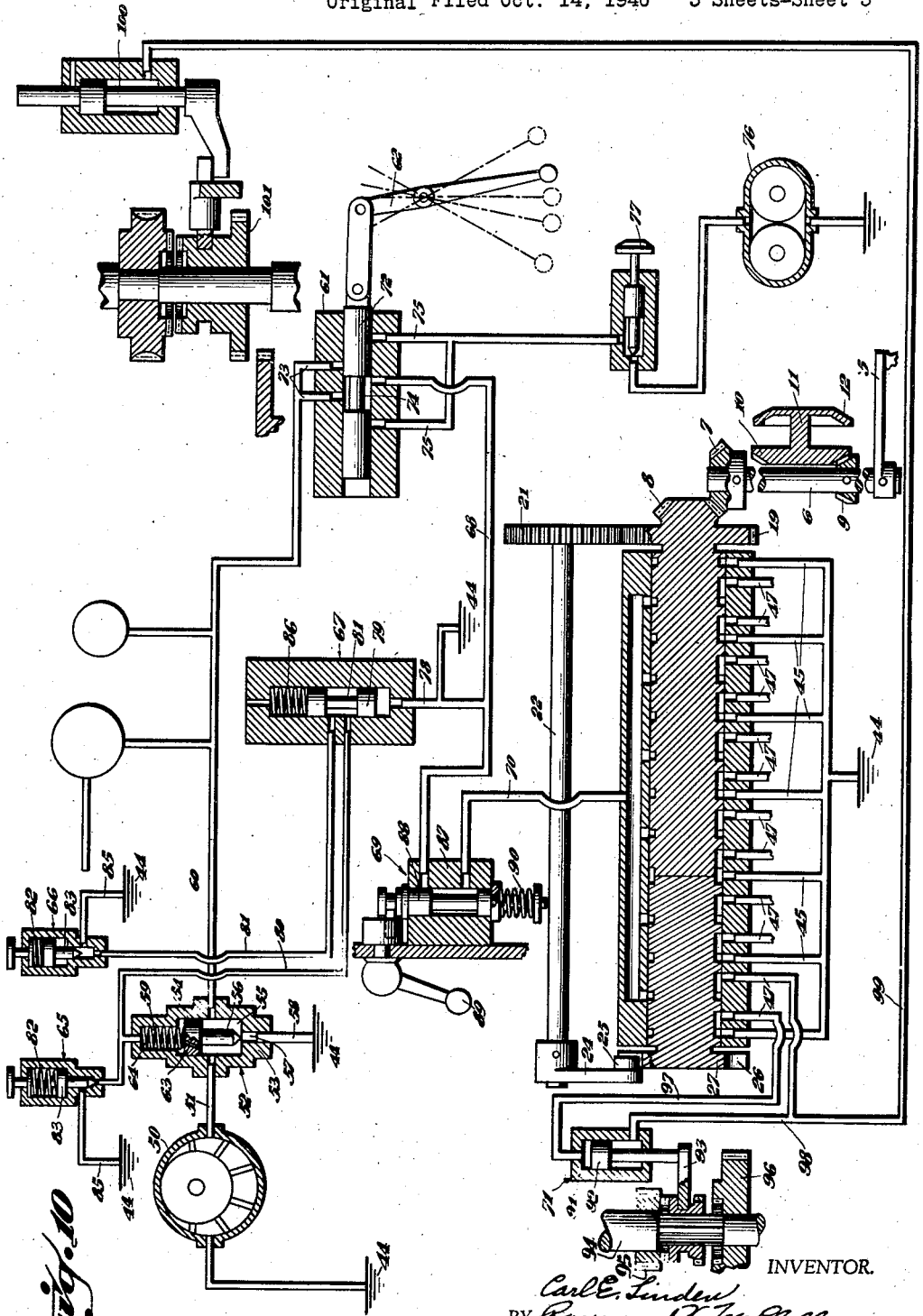

Patented Oct. 17, 1944

2,360,695

UNITED STATES PATENT OFFICE 2,360,695

HYDRAULIC GEAR SHIFTING AND DRIVING SYSTEM

Carl E. Linden, Norwood, and Raymond H. McClellan, Hamilton, Ohio, assignors to The Fosdick Machine Tool Company, Cincinnati, Ohio, a corporation of Ohio Original application October 14, 1940, Serial No. 361,044, now Patent No. 2,339,604, dated January 18, 1944. Divided and this application June 15, 1943, Serial No. 490,892

7 Claims. (Cl. 137—144)

This invention relates to multi-port valves for selectively directing fluid under pressure from a source to any predetermined number of pressure actuated devices. The present application is a division of our copending application Serial No. 361,044, filed October 14, 1940, and now issued as United States Patent No. 2,339,604, granted January 18, 1944, entitled Hydraulic gear shifting and driving system, and the invention is disclosed, by way of illustration, in the environment of a radial drill, the multi-port valve being employed by selectively controlling admission of hydraulic fluid to gear shifting motors through which the speed and feed of the drill spindle are adjusted.

In a machine of this sort, it is desirable to provide a plurality of tap lead feeds at which the spindle is driven and advanced at predetermined rates for tapping purposes. The spindle is operated mechanically through shiftable gears in a transmission and the various speeds and feeds are controlled through fluid shifting of the gears of the transmission. There are many shifting changes to be made, at least one, for instance, for each tap lead feed. Because of the multiplicity of movements which are required for such shifting, the valve selectively directing fluid to the substantial number of shifting motors, is apt to become a large and bulky unit occupying too much space on the machine if it is built along the usual lines.

To avoid the difficulties attending the use and installation of such equipment on the machine, the principal objective of the present invention has been to provide a multi-port valve which is small and compact, yet capable of servicing a large number of hydraulic motor units. Such valves are useful not only upon radial drills, as shown herein, but on a variety of machine tools and other devices where a plurality of units are individually operated or controlled.

According to the present invention, briefly, this result is accomplished through a valve consisting of at least two ported elements arranged within a casing and movable in predetermined relationship to one another. In a radial drill having tap lead feeds, one of these elements controls motors which effect major changes in the speed and feed while the other controls motors which effect minor speed or feed changes within the range established by the first. These ported elements move in unison for operation from a common point but one of them is indexed or advanced through a portion of a revolution only each time the other is moved through a complete revolution or cycle. Therefore, the one element repeats its positions as the other is indexed for effecting minor shifting variations in the major ranges governed by the first. In a typical machine arranged, for example, to provide speeds from 15 to 1000 R. P. M. major shifting is changed in steps of, say, 150 to 200 R. P. M. while the other element of the valve controls motors which provide for minor speed changes of, say, 5 to 15 R. P. M. in each of the major steps.

Other features of the invention and further details of it are disclosed in the accompanying drawings in which a preferred embodiment of the improvement is disclosed and, from the foregoing description of the principle of the invention, and the following detailed description, the various modifications which will present themselves to those skilled in the art readily will be appreciated.

In the drawings:

Figure 1 is a cross sectional elevation of the multiport valve of the present invention.

Figure 2 is a sectional view taken on the line 2—2 of Figure 1 illustrating in detail the indexing and operating means for moving one of the valve elements to eight different positions during each single revolution of the other valve element.

Figure 3 is a fragmentary face view of the speed indicator.

Figure 4 is a top plan view of the valve body.

Figure 5 is a side view thereof.

Figure 6 is an end view thereof.

Figure 7 is a developed view showing the porting and grooving arrangement of the two valve elements.

Figure 8 is a longitudinal sectional view of the valve elements.

Figure 9 is an end view of the valve elements.

Figure 10 is a diagrammatic view of a typical hydraulic circuit in which the multi-port valve of the present invention is employed with various valve elements and operating means in a radial drill.

The selector valve shown generally in Figure 1 consists of a casing 2 and rotatable elements indicated generally at 3 and 4 which are disposed within the casing 2 in end to end abutment on the same axis. A selector crank 5 (Figure 10) is pinned to the lower end of a rod 6. The upper end of the rod carries a bevel gear 7 which meshes with a bevel gear 8 on the axis of the valve elements 3 and 4. A second bevel gear 9 is also pinned to the shaft 6 and meshes with a bevel ring gear 10 which is fixed at the end of a shaft 11 carrying an indicator dial 12. The gears 9 and 10 are disposed within a casing 13 while the dial 12 rides within a housing 14 located, preferably, at the front face of the headstock casing 15, this casing extending upwardly over the multi-port valve to form a housing for it also. A reference pointer 16 is provided adjacent the dial 12 and the graduations on the dial, indicating speeds from 15 R. P. M. to 1000 R. P. M., for example, are arranged around the beveled marginal face of the dial.

The gear 8 which drives the valve elements 3 and 4, is in splined connection with a shaft 17 extending through the valve elements 2 and 3 and supported therein. Gear 8 is rotatable in a bearing sleeve 18. It will be seen therefore that as the crank 5 is rotated the dial 12 carries its graduations past the reference mark 16 and at the same time the valve element 4 is rotated.

Adjacent the outer endwise portion of the valve element 4 a gear 19 is fixed on the shaft 17 and rotates within an end cap 20 of the casing. This gear meshes with another gear 21 that is carried on a jack shaft 22 which is journalled in brackets 23—23 and extends along the casing. The other end of the shaft 22 carries a driving arm 24 of a Geneva gear mechanism. At the end of this arm a roller 25 is provided to successively engage the notches 26 of a Geneva gear element 27. The Geneva gear is formed at the outer end of a sleeve 28 which is extended into a bore in the valve element 3 and is in splined connection therewith. The casing at this end of the unit is provided with an end plate 29 which is bored to form a bearing for the sleeve 28. A collar 30 is pinned to the end of the shaft 17 to hold the Geneva gear in place.

Both the gear 19 at the one end and the Geneva gear 27 at the other end of the valve unit are provided with indexing or detent plates 31. These are similar to one another and each includes arcuate notches 32 in its peripheries, one for each notch of the Geneva gear. A detent roller 33 is axially mounted on an intermediate portion of an arm 34 which is pivoted on a pin 35 extending from a lug in the respective end plate 29 or 20. The outer end of each arm 34 is pulled downwardly by means of a tension spring 36, held at its one end on a pin 37 at the outer end of the arm and at its other end on a pin 38 extending from a lug 39 provided at the casing end plate.

In the structure just described, it will be seen that each revolution of the shaft 17 drives valve element 4 through a complete revolution and, through the gears 19 and 21, drives the shaft 22 through a complete revolution but thereby indexes the Geneva gear just one position and moves the valve element 3 through only a part of a revolution, that is, for example, one-eighth of a complete turn in the system disclosed. Therefore the valve element 4 makes eight complete turns each time the valve element 3 makes one complete turn, enabling the latter valve element to be employed for controlling the major shifting steps and the valve element 4, which repeats its positions, to be employed for repetitively effecting minor speed changes in each major speed change.

The casing is provided with a distribution channel 40 which extends along valve elements 3 and 4. From this channel fluid is distributed to the valve elements through the six inlet ports 41. These ports communicate with circumferential grooves 42 which are spaced substantially equally along the respective valve elements 3 and 4. Additional circumferential grooves 43, constituting exhaust or outlet grooves are arranged on the valve elements intermediate the inlet grooves 42 and each of the exhaust grooves 43 is in constant communication with the fluid system sump 44 through the leads 45, as shown in Figure 10.

The grooves 42 and 43 include dead-ended extensions 46 extending longitudinally of the valve elements, with the ends of these grooves being arranged to selectively cooperate with various fluid pressure outlet ports 47 provided in the casing (Figure 5). For each operative position of valve element 3 or valve element 4, as set through manipulation of crank 5, an exhaust groove 43 of one valve or the other is aligned with an outlet 47 of which there six sets of two each shown in the drawings for servicing six motors. Through this arrangement the opposite ends of respective gear shifting motors may be charged or exhausted alternately. The valve casing includes feet 48 through which it may be mounted on the machine, and also includes an inlet 49 leading to the distribution passage.

In the embodiment disclosed, provisions are available for accommodating sixty-four speed changes of which thirty-six are actually accomplished through shifting of the six motors serviced from the six sets of outlets 47. If desirable, the apparatus may be constructed to accommodate a greater or lesser number of changes by a different Geneva gearing ratio or by providing additional valve elements corresponding in function and relationship to the valve elements 3 and 4. That is, one valve element may be arranged to perform major changes in speed; a second valve element operated in conjunction with the first through a Geneva mechanism may function to repeat secondary variations within the ranges controlled by the first, and a third valve element driven in unison through a second Geneva mechanism may be employed to effect minor or incremental variations in the secondary ranges controlled by the second element. In this manner a myriad of devices may be selectively controlled through a valve which is small and compact.

The circuit shown diagrammatically in Figure 10 is a representative circuit of the type in which the selector valve of the present invention is adapted to be employed. The circuit disclosed is particularly useful in a radial drill which has provisions for feeding the spindle hydraulically at high speeds and also for feeding the spindle mechanically at a plurality of tap lead feed rates. This circuit is described in detail in our aforesaid copending application Serial No. 361,044.

Generally described, the system includes a source of hydraulic pressure such as a pump, a vented type relief valve which either bypasses the supply of fluid or directs it through the system for shifting gears and for driving the hydraulic feed motor. The delivery of fluid is controlled manually through a clutch which either directs it to the feed drive, at the time the clutch is connected for forward or reverse, or delivers it to the gear-shifting control valve of the present invention when the clutch lever is in neutral. The latter delivery is also controlled by a manually actuated valve at the option of the operator.

In this system the operator is permitted to set the gear-shifting valve, or preselect a given speed while the spindle is rotating at a different speed. The speed may be preselected prior to completion of the shift. Actual shifting is accomplished subsequently when the clutch lever is in a neutral position and the manually operated valve is held open. The apparatus is arranged to deliver low pressure fluid for shifting purposes and high pressure fluid for actuating the hydraulic feed motor.

As shown in the drawings, fluid is drawn from the reservoir 44 to a pump 50 which may be driven in unison with the spindle transmission. The pump delivers fluid through a pipe 51 to a relief valve 52 of the vented type. This valve includes a casing 53 and a valve element 54 operating within a chamber 55. The valve element includes a stem 56 which is arranged to seat over an exhaust opening 57 from which a pipe 58 leads back to the sump 55. A compression spring 59 housed within the casing 52 at the other side of the valve element urges the stem 56 against the exhaust opening.

A main delivery pipe 60 extends from the chamber 55 to a main control valve 61 which is actuated by a clutch lever 62. Normally, some of the fluid from the pump 50 is delivered through the pipe 51 into the chamber 55 and out through the exhaust or bypass 58; when the valve 21 is closed a gear-shifting or hydraulic motor actuating pressure builds up in the casing. In order to permit the spring 59 to be effective for closing off the bypass opening the valve element 54 is vented as at 63, permitting fluid to pass through the valve element to the chamber 64 above it. The chamber 64 is connected to either one of two unloader valves 65 and 66 which respectively unload in a high pressure range, e. g., 500-600 pounds per square inch, and a low pressure range, e. g., 125-175 pounds per square inch. An automatic control valve 67 controls the connection of the chamber 64 to the respective unloading valves. The chamber 64 is relieved therefor at the pressures at which valves 65 and 66 are set to unload and this permits pumping pressure to hold valve 21 away from its exhaust seat.

The main delivery pipe 60 extends to the lever control valve 61 while a pipe 68 extends from this valve to a manually operated control valve 69 which in turn is connected to the inlet 49 of the selector valve of the present invention by means of a pipe 70. From the selector valve fluid is distributed as directed by the control passages of the valve, as previously described, to the respective gear-shifting motors, one of which is indicated at 71.

The main clutch lever 62 is connected with a valve element 72 of valve 61 by means of a link. The delivery line 60 to this valve is branched at 73 for delivering fluid into the bore of the valve 61 over an intermediate portion of its length, while the valve element 72 includes an annular circumferential groove 74 corresponding to the spacing of the inlet openings. The pipe 68 extends from the bore intermediate the inlet openings. From this construction it will be seen that through an intermediate portion of the swing of the clutch lever, representing the neutral position, the valve may be moved without disturbing the flow through the manual control valve 69 and the selector valve. At either side of the pipe 68, where it enters the main control valve 61, branch passageways 75 enter the casing and in turn extend to a hydraulic feed motor 76 through a throttle valve 77. Thus, when the main clutch lever is moved either to the forward or reverse position, oil is delivered to the feed motor through the valve 72 to either one of the branch passages 75; in either of these positions the gear-shifting mechanism is deprived of fluid.

To provide for shifting of the gears with low pressure fluid and for driving the hydraulic motor 76 at high pressure the pressure control valve 67 is arranged to operate automatically. It is connected with the delivery line 68 through a line 78. This valve 67 includes a valve element 79 which is shuttled back and forth between two positions. Fluid above the valve element 54 of the relief valve 52 may pass through line 80 through an annular groove 81 cut in the shuttle valve element 79 and back to the low pressure unloader valve 66 through the line 81. The unloader valves 65 and 66 are duplicates except for weight and tension of their respective unloader springs 82. These valves in each case consist of a needle type valve element 83 which is normally urged downwardly by means of spring 82 to block the flow of fluid through a bore. The tension of the springs is adjustable through set screws and in each case the respective pipes 85 exhaust fluid to the sump 44 when the valves unload.

As the valve element 72 of the main control valve 61 is moved to a feed drive position the supply of fluid to shuttle valve 67 is cut off and the spring 86 thereof moves the valve element downwardly to block the flow of oil to the unloader valve 66. At this time the only point at which pressure may be relieved in the system is at the high pressure valve 65 except for the bleeding of a small amount of fluid to the sump from the lower portion of the bore of the automatic valve 67 which is necessary to permit return of the element thereof. This bleeding does not interfere with the normal operation of the system. Under these circumstances therefore oil at high pressure is delivered to the throttle valve 77.

The manual shifting control valve 69 consists of a casing 87 in which a valve element 88 is slidably mounted. The valve element externally of the casing includes an annular groove engaged by a lift pin extending from a control lever 89 which is journalled in the headstock casing. At the other end of the valve element it carries a return spring 90. The valve normally is closed and constitutes a stop between the lines 68 and 70 but, when the handle 89 is rotated, the valve is lifted and oil is free to flow from the line 68 to the line 70 and to the selector valve.

In the typical system which is shown in the drawings the gear shifting device 71 consists of a cylinder 91 and a plunger 92, the outer end of which carries a yoke 93 engaged with a conventional groove of a coupling element which, in one position, couples a shaft 94 with a gear 95 or, in the other position, couples the shaft with a gear 96. In the structure shown the shifting plunger has its upper end communicating with an outlet groove 43 of the selector valve by means of a pipe 96, while the opposite end of the cylinder is charged through a pipe 98 communicating with the charging groove 42. Various shifting motors 71 are employed to perform the various shifts required to obtain the different speeds or different functions as the case may be, the longitudinal dead-ended slots of the selector valve determining between them, by their arrangement, the various sequences desired.

This system also may include a lock-out circuit including the line 99 and a lock-out actuator 100 which operates a feed clutch element 101 of the tap lead transmission for the purpose of insuring that an operator may not engage the positive tap feed while the spindle is operating at a high speed range. This portion of the circuit is described in detail in the aforesaid copending application and is therefore not repeated here.

The selector valve of the present invention provides a small and compact unit which may be embodied directly in a transmission casing or the like in a most accessible position. The particular selector valve shown in the drawings accommodates sixty-four different shifting motors or actuators like the motor 71 and, by varying the Geneva gear ratio of it or by employing three or four elements corresponding to the elements 3 and 4 of the valve and suitable Geneva motions for operating them in predetermined cyclic relation, still greater numbers of pressure actuated devices may be selectively controlled.

Having described our invention, we claim:

1. A selector valve, comprising a casing, valve elements rotatably mounted in said casing and disposed end to end, means for rotatably setting said valves, said means directly rotating one element, Geneva gear means for intermittently rotating the other valve, said Geneva gear means connected to said setting means and adapted to rotate the latter valve to different positions, one for each rotation of the first valve element.

2. A selector valve for distributing fluid for gear shifting purposes, comprising a cylindrical casing including a bore, a pair of rotatable valve elements rotatably mounted in said bore, said valve elements disposed end to end on the same axis, said valve elements and casing including cooperating grooves and ports, means rotating one of said valve elements, and means for rotating the other valve element through a portion of its rotation each time the first valve element is rotated through 360°.

3. A valve for directing oil pressure to a system of hydraulic gear shifting devices, comprising a valve casing housing two rotary valve elements abutting end to end, appropriate oil inlets and oil outlets to the rotary valve elements through said casing, appropriate oil grooves in one of said rotary elements for directing oil pressure to the major gear change shifting devices, and appropriate oil grooves in the other of said rotary elements for directing oil pressure to the minor gear change shifting devices, and indexing means for moving the major gear change valve element through a portion of a revolution while the minor gear change valve element is completely revolved.

4. A valve for directing oil pressure to a system of hydraulic gear shifting devices, comprising a valve casing, rotary valve elements contained within said casing in end to end relationship and independently rotatable therein, fluid inlets and fluid outlets to said valve elements through said casing, one of said elements having fluid passageways for directing fluid pressure to major gear change shifting devices and the other of said elements having fluid passageways therein for directing fluid pressure to minor gear change shifting devices, and an indexing mechanism for rotating the major gear change valve element through a portion of a revolution when the minor gear change valve element is rotated through a complete revolution.

5. A valve for directing oil pressure to a system of hydraulic gear shifting devices, comprising a valve casing, rotary valve elements contained within said casing in end to end relationship and independently rotatable therein, fluid inlets and fluid outlets to said valve elements through said casing, one of said elements having fluid passageways for directing fluid pressure to major gear change shifting devices and the other of said elements having passageways therein for directing fluid pressure to minor gear change shifting devices, means for rotating one of said elements, and an indexing mechanism operable in unison with said means for rotating the other of the elements through a portion of a revolution only, thereby the first-named element repeats its position a predetermined number of times while the second-named element is being driven through a single revolution.

6. A valve for directing oil pressure to a system of hydraulic gear shifting devices, comprising a valve casing having a longitudinal bore therein, a distribution passageway arranged adjacent the bore and inlet openings extending from the distribution passageway to the bore, valve elements contained within said casing in end to end relationship, one of said elements having channelways for receiving fluid from said distribution passageway and arranged for directing fluid pressure to major gear change shifting devices selectively upon rotation thereof, and the other of said elements having channelways therein for receiving fluid from said distribution passageway and arranged for directing fluid pressure selectively to minor gear change shifting devices, means for rotating the first-named of said elements whereby major gear change shifting is effected, and means including an indexing mechanism for rotating the other devices at a predetermined ratio with respect to rotation of the first whereby said second-named valve element is driven repetitively through an number of revolutions when the valve element for controlling major gear change shifts is rotated through a single revolution.

7. A valve for directing oil pressure to a system of hydraulic gear shifting devices, comprising a valve casing having a longitudinal bore therein, rotary valve elements contained within said bore in end to end relationship, fluid inlets and fluid outlets to said passageways through said casing, with one of said elements having fluid passageways for directing fluid pressure to major gear change shifting devices and the other of said elements having fluid passageways therein for directing fluid pressure to minor gear change shifting devices, a gear carried by one of said elements, a shaft carried by said casing and having a gear meshing with said first-named gear, the other of said elements having a Geneva wheel and the opposite end of said shaft having a member for driving said Geneva gear, whereby said valve elements are rotated differentially with respect to one another, and detent means for holding said elements in given positions of rotation.

CARL E. LINDEN.
RAYMOND H. McCLELLAN.